E. L. MOORE.
NUT LOCK.
APPLICATION FILED NOV. 2, 1915.
1,208,350.
Patented Dec. 12, 1916.
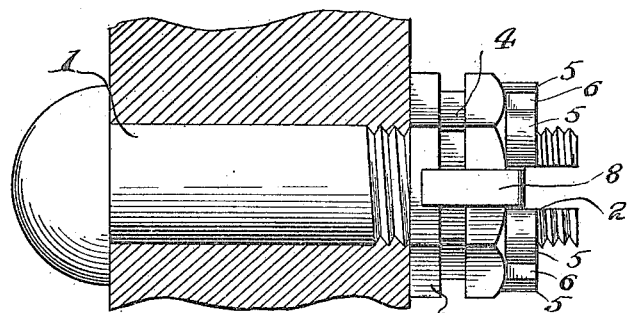
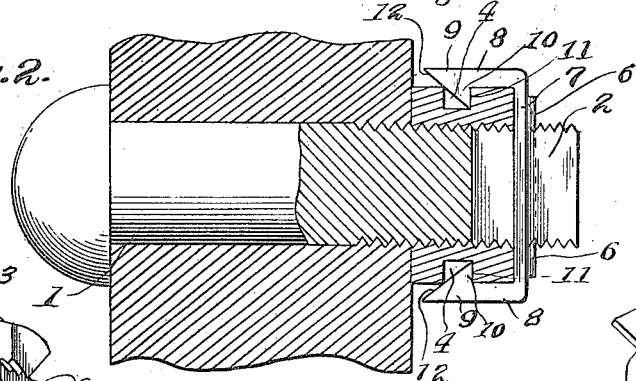
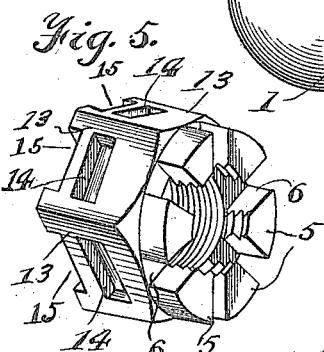
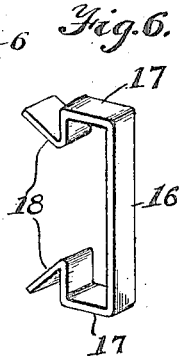
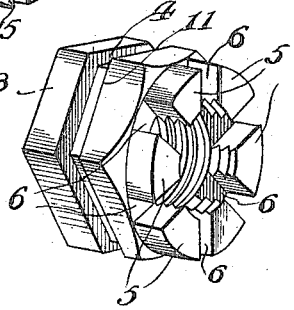
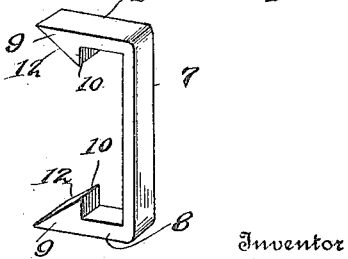
Inventor
E. L. Moore.
By Victor J. Evans
Attorney
Witnesses

UNITED STATES PATENT OFFICE.

EDMUND L. MOORE, OF VEGA BAJA, PORTO RICO.

NUT-LOCK.

1,208,350.

Specification of Letters Patent.

Patented Dec. 12, 1916.

Application filed November 2, 1915. Serial No. 59,255.

*To all whom it may concern:*

Be it known that I, EDMUND L. MOORE, a citizen of the United States, residing at Vega Baja, Porto Rico, have invented new and useful Improvements in Nut-Locks, of which the following is a specification.

This invention relates to nut locks, and has for its primary object the provision of a device of this character consisting of a relatively resilient locking element designed to be respectively associated with the locking bolt so as to positively secure the former against retrograde rotation after it has been adjusted to the desired or intended position upon the threads of the bolt, and it is further contemplated that the locking element be so formed that it may be expeditiously applied to the nut and to the bolt and removed therefrom as occasion may demand.

In the drawings: Figure 1 is a side view of a nut and bolt showing the application of the improved lock thereto; Fig. 2 is a vertical longitudinal section therethrough; Fig. 3 is a perspective view of the nut; and Fig. 4 is a perspective view of the locking element. Fig. 5 is a perspective view of a modified form of nut. Fig. 6 is a perspective view of a modified form of locking element.

In carrying the invention into effect, provision is made of a bolt 1 which, aside from forming therein a longitudinal slot 2, is substantially the same as a bolt of old and well known construction. The nut 3 which is threadedly mounted upon the bolt is of peculiar design, being provided with a base of hexagonal or other desired form wherein will be provided a plurality of relatively associated annular surfaces that are designed to be gripped by the jaws of a wrench on applying the nut to the bolt or removing the same therefrom. The base has formed therein a continuous groove 4 which is designed to coöperate with a locking element which will be hereinafter fully explained. Extending upon the outer surface of the nut are lugs 5 which are so associated with each other as to form diametrically disposed recesses 6 between adjacent lugs, whereby said recesses may be associated and alined with the slot 2 in the outer end of the bolt 1.

The locking element is of substantially U-shaped formation and is preferably constructed of a single length of spring steel wire bent to present a relatively long securing branch 7 and substantially right angular locking terminals 8, 8. These terminals are upset at their ends to form lugs 9 having shoulders 10 which are designed to come in close contact with the co-acting shoulder 11 of the groove 4. The locking element as constructed is adapted to span the nut so that the relatively long branch 7 may extend through the slot 2 and through the diametrically disposed recesses 6 formed between the lugs 5, while the short arms 8 of said element are peculiarly adapted to straddle the sides of the nut in order that the shoulders 10 may be effectively presented against the shoulder 11 and the element thereby rendered effective for the purpose of securing the nut against retrograde rotation. The arms 8, 8 are relatively springy and are adapted for suitable radial separation from one another during the process of applying the element to the nut. In order to cause a ready separation of the arms 8, 8 the free ends of the arms are beveled as at 12, so as to be initially brought into contact with the edges of the nut on application of pressure to the locking element and to thus in turn cause the arms to readily take to such positions as are necessary for proper association of the said element with the nut, as will be understood. On reference to the drawings it will be appreciated that, when applied, the shoulders 12 of the locking element are disposed at substantially an obtuse angle to the adjacent flat surfaces of the base of the nut. It is desired that this feature be well understood for the reason that the spaces between the said beveled surfaces 12 and the mentioned adjacent surfaces of the nut will readily accommodate a suitable instrument which may be employed for the purpose of extracting the locking element from the nut when occasion demands. Any suitable extracting element or tool may be employed and by simply exerting an upward pressure against the surfaces 12 the arms 8 will instantly separate and the shoulders 10 will be properly moved out of mating contact with the shoulder 11.

In Fig. 5 there is shown a slight modification of nut wherein the flat side faces 13 thereof are formed with recesses 14 and 15 in contra-distinction to the continuous groove 4 in the nut 3 hereinbefore described, the recesses 14 being disposed medially of the said faces while the recesses 15 are formed in the inner face of the nut at the marginal edge thereof and such recesses 14 and 15 are adapted to receive the shoulders of the arms 8 of the locking element.

In Fig. 6 there is shown a slight modification of locking element wherein the same is struck from a flat metallic strip 16 and is bent into a substantially U-shape, the limbs 17 of which are formed with hook terminals 18 which are bent therefrom, and this locking element is used in a similar manner to the locking element hereinbefore set forth. It will be apparent that either the locking element can be employed for engagement in the groove 4 in one nut or the slots 14 and 15 in the other nut.

It is of course to be understood that the invention is not limited to the precise construction of nuts nor the precise construction of locking elements as hereinbefore described and disclosed in the drawing, as variations and modifications can be made therein such as come properly within the scope of the appended claims without departing from the spirit of the invention or sacrificing any of its advantages.

From the foregoing it will be understood that a locking device of maximum durability is formed which, aside from its durability, will be found to be possessed of the required qualifications to hold the nut secure against retrograde rotation. The particular formation of the locking element also renders the operation of applying the same to or removing the element from the nut a comparatively simple task which may be done without the provision of special implements.

Having thus described my invention, I claim:

1. A nut lock comprising, in combination with a bolt having a longitudinal slot, and a nut provided with diametrically disposed recesses and a substantially circumferential slot, of a locking element respectively traversing the slot and the alined recesses of the nut and provided with branch locking terminals yieldingly confined in the groove of the nut.

2. In a nut lock, the combination with a bolt having a longitudinal slot and a nut having a series of diametrically opposed recesses and also a slot at right angles to the recesses, of a resilient locking element provided with a long arm extending through the slot in the bolt and movable longitudinally therein and also extending through two of the said diametrically opposed recesses in the nut and having relatively yieldable short arms extending over the sides of the nut and provided with shouldered surfaces engaged in the slot.

In testimony whereof I affix my signature in presence of two witnesses.

EDMUND L. MOORE.

Witnesses:
FIDELINA AGUAYO,
W. L. POPE.